(12) United States Patent
Callaway

(10) Patent No.: US 8,759,252 B1
(45) Date of Patent: *Jun. 24, 2014

(54) MATERIAL AND METHOD FOR THE SORPTION OF HYDROGEN SULFIDE

(71) Applicant: Michael D. Callaway, Sapulpa, OK (US)

(72) Inventor: Michael D. Callaway, Sapulpa, OK (US)

(73) Assignee: Michael D. and Anita Kaye, Sapulpa, OK (US), Callaway Revocable Trust ( * ) Notice: Subject to any disclaimer, the term of this patent is extended or adjusted under 35 U.S.C. 154(b) by 0 days.

This patent is subject to a terminal disclaimer.

(21) Appl. No.: 13/849,857

(22) Filed: Mar. 25, 2013

Related U.S. Application Data

(63) Continuation-in-part of application No. 12/899,515, filed on Oct. 6, 2010, now Pat. No. 8,404,031.

(51) Int. Cl.
  *B01D 59/26* (2006.01)

(52) U.S. Cl.
  USPC .............................. 502/406; 95/136; 96/108

(58) Field of Classification Search
  None
  See application file for complete search history.

(56) References Cited

U.S. PATENT DOCUMENTS

| | | |
|---|---|---|
| 1,809,990 A | 6/1931 | Seil |
| 2,983,573 A | 5/1961 | Moore et al. |
| 3,199,946 A | 8/1965 | Fujita et al. |
| 3,492,083 A | 1/1970 | Lowicki et al. |
| 3,761,534 A | 9/1973 | Sun et al. |
| 4,061,479 A | 12/1977 | Holter et al. |
| 4,089,809 A | 5/1978 | Farrior, Jr. |
| 4,201,751 A | 5/1980 | Holter et al. |
| 4,324,298 A | 4/1982 | Fox |
| 4,363,790 A | 12/1982 | Anderson et al. |
| 4,366,131 A | 12/1982 | Fox |
| 4,478,800 A | 10/1984 | van der Wal et al. |
| 4,519,992 A | 5/1985 | Alkhazov et al. |
| 4,609,539 A | 9/1986 | Horecky et al. |
| 4,956,160 A | 9/1990 | Reichert |
| 4,983,277 A | 1/1991 | Audeh et al. |
| 5,244,641 A | 9/1993 | Khare |
| 5,478,541 A | 12/1995 | Samuels et al. |

(Continued)

FOREIGN PATENT DOCUMENTS

| | | |
|---|---|---|
| JP | 2005161116 | 6/2005 |
| JP | 2007125509 | 5/2007 |

OTHER PUBLICATIONS

Sigma Aldrich: Particle Size Conversion p. T848 of the Aldrich 2003-2004 Catalog/Handbook of Fine Chemicals.

*Primary Examiner* — Duane Smith
*Assistant Examiner* — Phillip Shao
(74) *Attorney, Agent, or Firm* — GableGotwals

(57) ABSTRACT

The various embodiments of the invention relates to the composition of a hydrogen sulfide capture material and the related method of manufacture. The hydrogen sulfide capture material is formed by solubilizing an iron source in acid to form an aqueous solution comprising iron chloride, neutralizing the aqueous solution with a caustic solution to form a neutralized solution, washing the neutralized solution to separate it into water and a slurry, forming a thickened slurry by removing additional water from the slurry, separating the thickened slurry to produce filtered water and a wet filter cake, and drying the wet filter cake to form granules. The hydrogen sulfide capture material of the present invention removes hydrogen sulfide for a longer time and at a faster rate than the materials of the prior art, thereby improving the efficiency and decreasing the cost of sour gas treatment.

9 Claims, 5 Drawing Sheets

(56) References Cited

U.S. PATENT DOCUMENTS

| | | |
|---|---|---|
| 5,997,829 A | 12/1999 | Sekine et al. |
| 6,126,911 A | 10/2000 | Scranton, Jr. |
| 6,200,482 B1 | 3/2001 | Winchester et al. |
| 6,447,577 B1 | 9/2002 | Espin et al. |
| 6,500,237 B2 | 12/2002 | Winchester et al. |
| 6,809,063 B2 | 10/2004 | Scranton Jr. et al. |
| 6,887,445 B2 | 5/2005 | Braga et al. |
| 6,962,616 B1 | 11/2005 | Bandosz et al. |
| 7,396,522 B2 | 7/2008 | Ayyer et al. |
| 7,569,199 B1 | 8/2009 | Barron et al. |
| 7,651,973 B2 | 1/2010 | Schlegel |
| 7,717,979 B2 | 5/2010 | Liu et al. |
| 7,744,841 B2 | 6/2010 | Farha |
| 7,767,001 B2 | 8/2010 | Schlegel et al. |
| 7,811,360 B2 | 10/2010 | Schlegel et al. |
| 7,829,046 B2 | 11/2010 | Baum et al. |
| 7,942,953 B2 | 5/2011 | Schlegel et al. |
| 7,993,616 B2 | 8/2011 | Comrie |
| 8,404,031 B1 * | 3/2013 | Callaway .................. 96/108 |
| 2002/0059864 A1 | 5/2002 | Janssen et al. |
| 2010/0072139 A1 | 3/2010 | Sambrook |
| 2010/0210449 A1 | 8/2010 | Liu et al. |
| 2011/0014101 A1 | 1/2011 | Suzuki et al. |
| 2011/0160470 A1 | 6/2011 | Henstock et al. |
| 2011/0256039 A1 | 10/2011 | Liu et al. |
| 2011/0256044 A1 | 10/2011 | Liu et al. |
| 2011/0260102 A1 | 10/2011 | Liu et al. |
| 2011/0260103 A1 | 10/2011 | Liu et al. |

* cited by examiner

MATERIAL AND METHOD FOR THE SORPTION OF HYDROGEN SULFIDE

CROSS-REFERENCE TO RELATED APPLICATIONS

This application is a continuation-in-part application which claims priority to U.S. patent application Ser. No. 12/899,515, filed Oct. 6, 2010, which claimed priority of the provisional application with Ser. No. 61/249,141 titled "Material and Method for the Sorption of Hydrogen Sulfide" filed on Oct. 6, 2009.

STATEMENT REGARDING FEDERALLY SPONSORED RESEARCH OR DEVELOPMENT

Not applicable

FIELD OF THE EMBODIMENTS

The field of the embodiments is generally gas and vapor stream processing. More specifically, the field of the embodiments is capture of hydrogen sulfide laden fluid streams.

BACKGROUND OF THE EMBODIMENTS

Hydrogen sulfide is a highly dangerous and corrosive gas that is contained in a variety of man-made and naturally occurring fluid streams. One of these fluid streams is the flow of natural gas from a well. Many natural gas wells contain an appreciable amount of hydrogen sulfide, and this hydrogen sulfide must be removed to make the gas marketable to natural gas gathering and transmission systems. One of the purposes of the embodiments described in this patent application is to remove hydrogen sulfide from fluid streams, including natural gas streams to make the natural gas marketable.

One of the most technically challenging and economically costly aspects of removing hydrogen sulfide with granular/solid scavengers is removing the spent capture material from the sulfur removal vessel. In many cases, the physical and chemical reaction that occurs when hydrogen sulfide is removed from the gas or vapor stream, changes the capture material from free-flowing particles into monolithic mass. This solid mass sometimes requires workers to enter the vessel through manways and hammer and chisel the material into smaller pieces for removal from the vessel. This operation is not only extremely unpleasant, but time consuming and costly for the operator of the hydrogen sulfide capture process and potentially unsafe for the laborers.

DETAILED DESCRIPTION OF THE PREFERRED EMBODIMENTS

Figure 1:
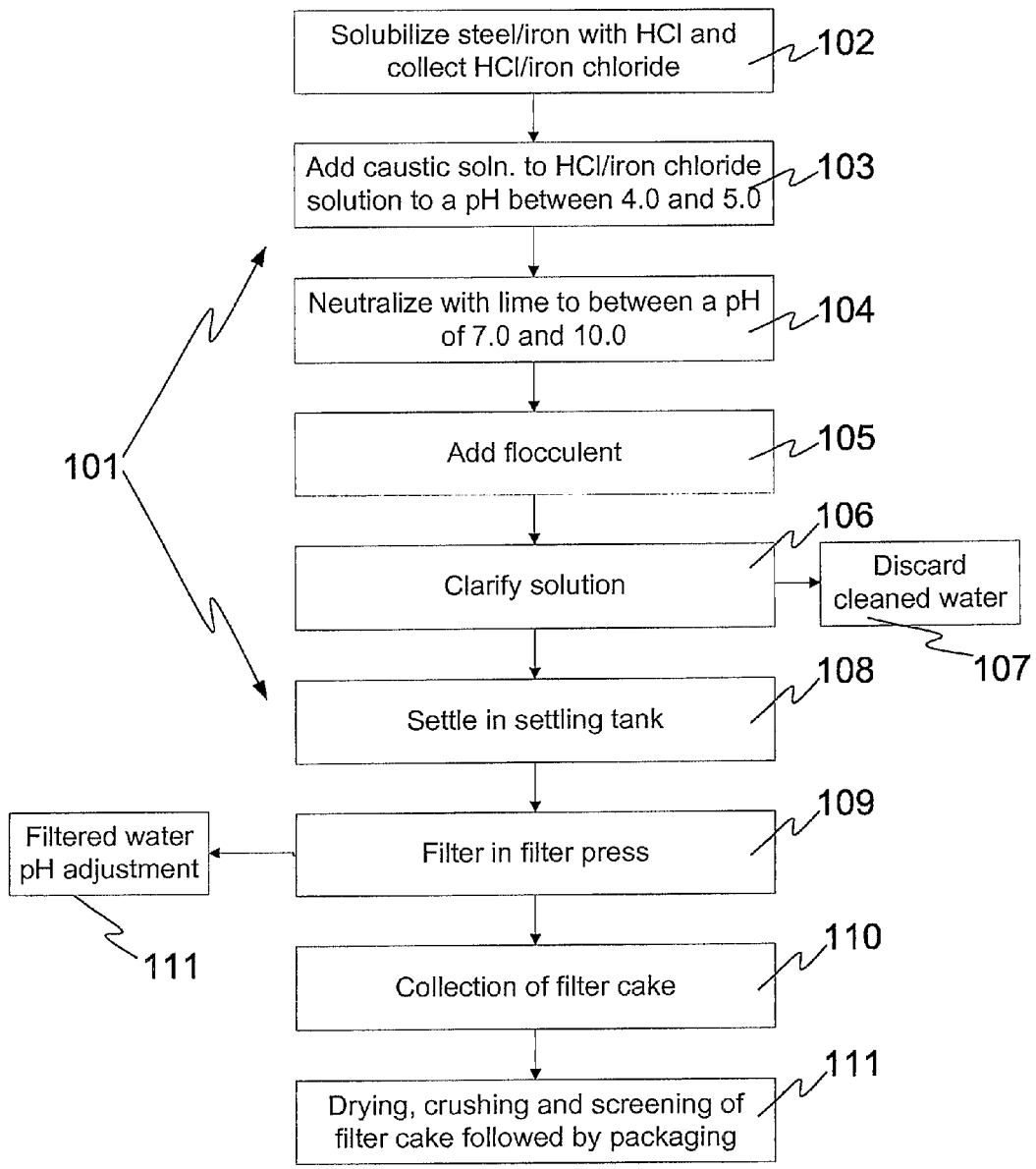
FIG. 1 shows a flow diagram of the process of making the hydrogen sulfide capture material.

The embodiments of this invention relate to a composition of matter and method remove hydrogen sulfide ($H_2S$) from gas or vapor streams. The material is manufactured from steel or iron. The iron or steel can be scrap materials from manufacturing operations or can be recycled material. In other embodiments, the material is manufactured from iron oxide powders used as starting material. The various embodiments described herein make economic use of this scrap steel or iron.

In the preferred method of manufacture 101 of the hydrogen sulfide capture material (hereinafter "Capture Material" or SULFABATE™ (CalTech Global, LLC, Sapulpa, Okla.)), the iron is solubilized with hydrochloric acid (HCl) 102 into an aqueous solution of hydrochloric acid and iron chloride. In one embodiment the iron chloride is ferric chloride, $FeCl_3$. In another embodiment, the iron chloride is ferrous chloride, $FeCl_2$. In another embodiment, the iron chloride is a mixture of ferric chloride, $FeCl_3$, and ferrous chloride, $FeCl_2$. The iron chloride and hydrochloric acid solution is then combined with caustic solution 103 to adjust the pH to between 4.0 and 5.0 pH units. The base used in the caustic solution may be a metal hydroxide, such as sodium hydroxide or calcium hydroxide. The solution that results from combining the iron chloride and hydrochloric acid solution and caustic solution 103 is comprised mostly of suspended and solubilized iron, and is further neutralized 104 to a pH of between 7 and 10 pH units, preferably between 7 and 8 pH units. Next, flocculent may be added 105 and mixed with the solution. The solution is now comprised of mainly suspended iron hydroxide/iron oxide solids. The solution then proceeds to a water-clarifier system 106 where the solids are washed and separated by gravity and the cleaned water is discarded 107. The slurry proceeds to the next step of the manufacturing process where the slurry from the flocculent step goes to a settling tank 108 and then the thickened slurry goes to a filter press 109 where the wet filter cake is collected. The wet filter cake is then subsequently dried to between 0 and 30 percent moisture content. Excess calcium hydroxide from the neutralization step may act as a binding agent when the wet filter cake is dried. The dry filter cake granules are then crushed and screened between No. 4 to No. 40 mesh size screens and packaged. The granules that are larger than the size of No. 4 mesh are crushed, screened and then sacked. The dust from the entire process is collected and pelletized in a rolling pan using a binder, preferably lime.

An embodiment of the Capture Material was analyzed using x-ray diffraction analysis and energy-dispersive x-ray spectroscopy. As shown in Table I, an embodiment of the Capture Material contains calcite, maghemite, amorphous mineral constituents, and trace amounts of quartz and lepidocrocite. Table II identifies the concentration of various elements in the same embodiment of the Capture Material in terms of percent by weight. The Capture Material contains approximately 55% iron and 25% calcium, as well as lesser amounts of silicon, phosphorus, sulfur, titanium, manganese, copper, and zinc. However, these lesser amounts may not be present if different raw materials are used. The composition of the Capture Material may vary depending upon the type of raw materials and chemicals used to make the Capture Material. In addition, the Capture Material has a preferred particle size of less than 1,000 nanometers.

The effectiveness of the Capture Material is due in part to the large surface area that results in the manufacturing of the Capture Material. This increase in surface area is due to a combination of process of the scrap steel, the addition of the flocculants, surfactants and the presence of the trace metals. In addition, the effectiveness of the Capture Material is in part due to the presence of both crystalline and amorphous material.

In addition, the Capture Material contains approximately 25% water. Therefore, the Capture Material is approximately the composition of $Fe(OH)_3$. The high level of $Fe(OH)_3$ processed in the manner discussed herein leads to the high surface area of Capture Material, which may range from approximately 50 $m^2/g$ to approximately 400 $m^2/g$.

It is important during the process to keep the maximum temperature of the filter cake below 250° F. Above 250° F., the material loses activity. A variety of materials could be used as a binder. If the filter cake is sufficiently dry, no binder is required. Because a binder is not required, the dry filter cake has a very high porosity and low bulk density. The dry filter cake is very hydrophobic and does not readily pick up water. The filter cake contains trace amounts of copper, zinc and lead as well as other heavy metals. These trace elements may help improve the performance of the material. Upon drying, the material shrinks to about 50% of its initial volume.

In other embodiments of the Capture Material, it is possible to add liquid triazine as an additional hydrogen sulfide scavenger to the filter cake and collected processing dust to act as a binder and thereby increasing the capacity and the rate of hydrogen sulfide uptake in subsequent processing.

In yet another embodiment of the instant invention it is also possible to add $H_2S$-consuming bacteria along with sodium nitrite ($NaNO_2$) and sodium nitrate ($NaNO_3$) to the filter cake to increase the hydrogen sulfide uptake capacity of the Capture Material.

The resulting Capture Material is subsequently used to remove hydrogen sulfide from a variety of gaseous and vapor streams. In all embodiments, the Capture Material possesses both a faster reaction rate and greater uptake capacity of hydrogen sulfide than comparable prior art materials. The result of the increased rate is that more gas or vapor containing hydrogen sulfide can processed in an equal amount of time or in a smaller bed depth of Capture Material. The result of the increased capacity is that the Capture Material must be replaced less often than comparable prior art material. In one application, the Capture Material is used to remove hydrogen sulfide from sour natural gas thereby making the gas acceptable for purchase by gas distribution systems and for subsequent residential and commercial use.

Hydrogen sulfide is a particularly dangerous material that is toxic at relatively low levels, therefore the utility of this material is to remove hydrogen sulfide and convert the hydrogen sulfide into less toxic elemental sulfur. The spent/reacted Capture Material product is not hazardous and therefore approved for disposal in municipal landfills. The Capture Material pellets are sized and screened to a narrow-mesh range to ensure minimum pressure drop through a contact tower. The Capture Material pellets can be shipped in super sacks to minimize labor and expense during installations. The Capture Material granules are also easily removed from the contact tower when saturation is realized. The various embodiments remain granular and therefore allow for easy removal from the vessel, which is a significant advantage over similar hydrogen sulfide removal materials. The capture material pellets are comprised of waste material and therefore are a recyclable and green product.

Figure 2:
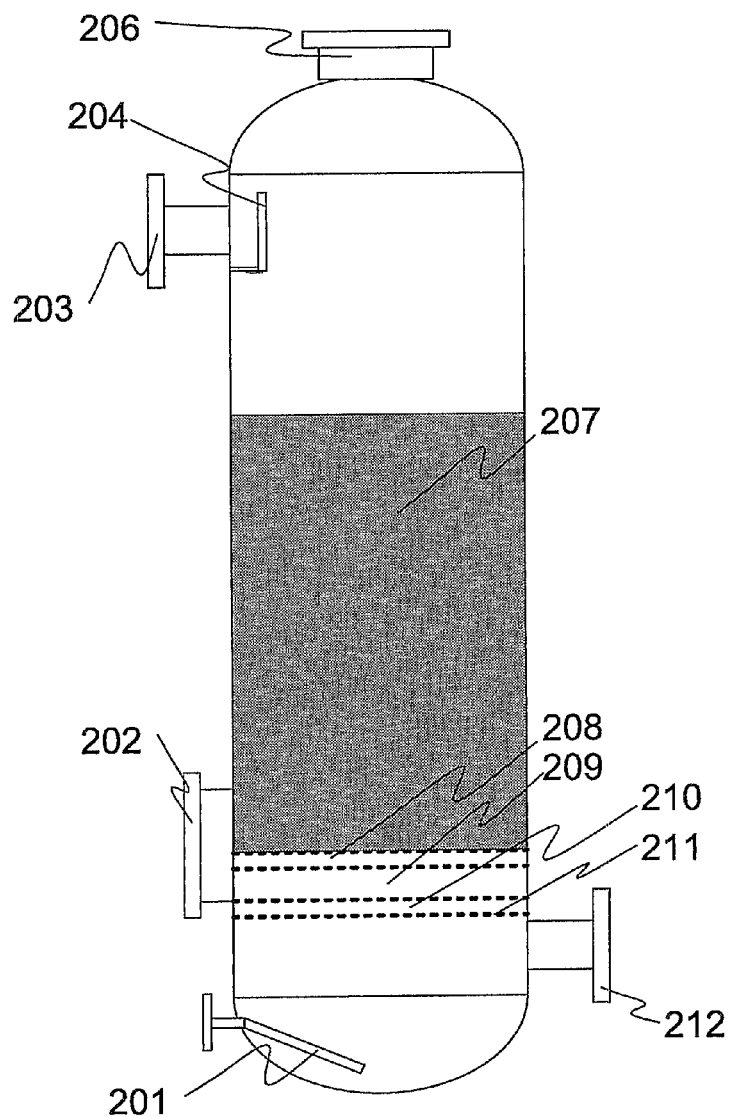
FIG. 2 shows an embodiment of the process of using the hydrogen sulfide capture material to strip hydrogen sulfide from the natural gas.

An embodiment for the process for using the Capture Material pellets is to place the Capture Material pellets in a sorption tower as shown in FIG. 2. In this embodiment, there is a bed of sorbate Capture Material 207. The Capture Material pellets are supported by a filter foam support 208 and added to the bed to form an absorption volume. In this embodiment, the filter foam support 208 is supported by a 40-mesh screen support 209. The 40-mesh screen support 209 is in turned supported by a 4-mesh screen support 210. The 4-mesh screen 210 is supported by a permanently affixed support grid 211. Sour gas, that is gas that is high in hydrogen sulfide, is added at the sour gas inlet, 203. The sour gas is first diverted by an inlet gas deflector 204 then proceeds downward through the Capture Material bed.

The sour gas proceeds downward through the Capture Material bed 207. Hydrogen sulfide is sorbed by the Capture Material in the Capture Material bed 207. The treated gas continues downward through the filter foam support 208, 40-mesh support 209, 4-mesh support 208, and the permanent support grid 209. The treated gas then exits the sorption tower through the treated gas outlet 212. The embodiment is also comprised of a loading man way 206 and a cleanout man way 202 for charging new material and removing spent Capture Material.

A significant advantage of the Capture Material over the prior art materials is in the ease of removal of the spent Capture Material from the sorption tower. In many cases with the prior art materials, those materials bind into larger clumps and lumps of material making the removal from the tower difficult. In all embodiments of the Capture Material, the sorption of hydrogen sulfide does not bind the material.

Figure 3:
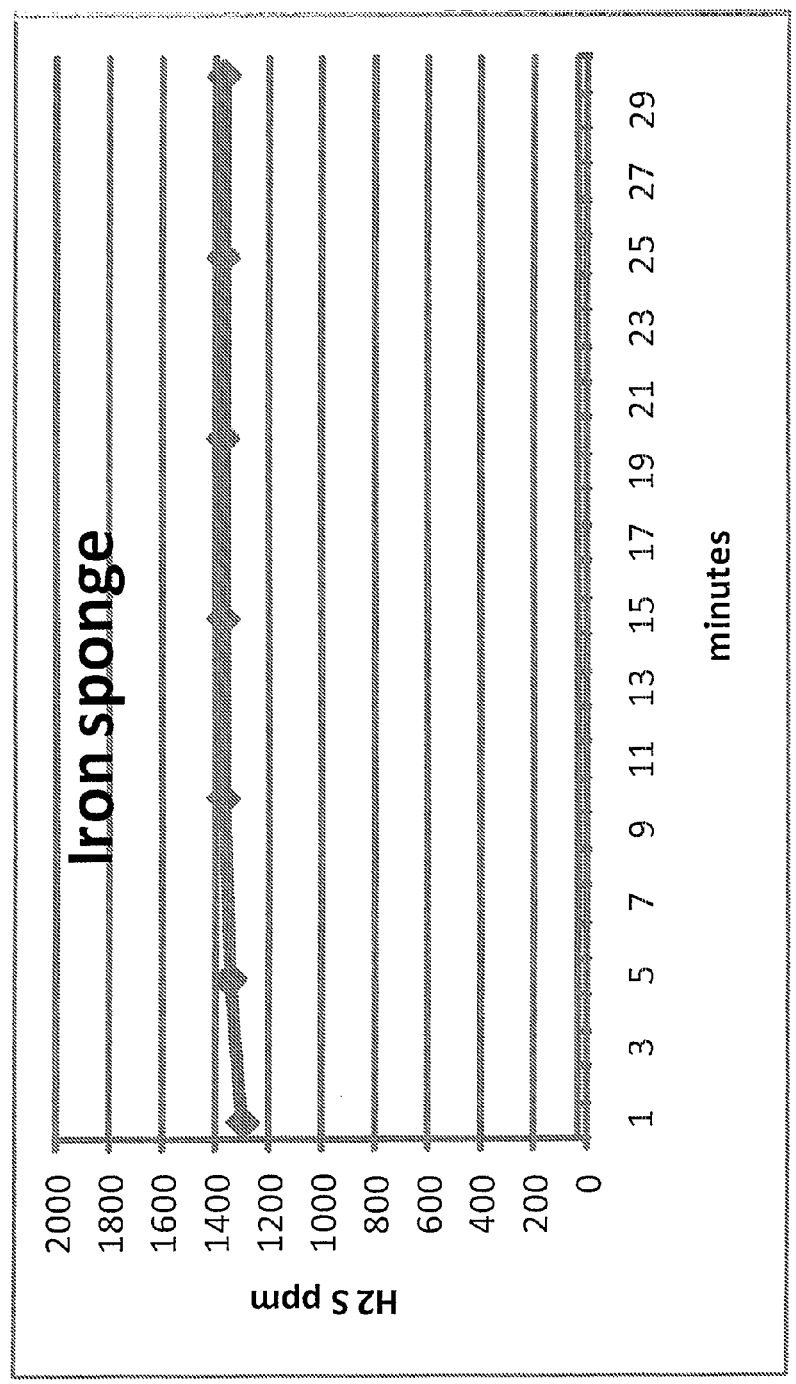
FIG. 3 shows the performance of a representative sample of a prior art invention in removing hydrogen sulfide from a gas stream.
Figure 4:
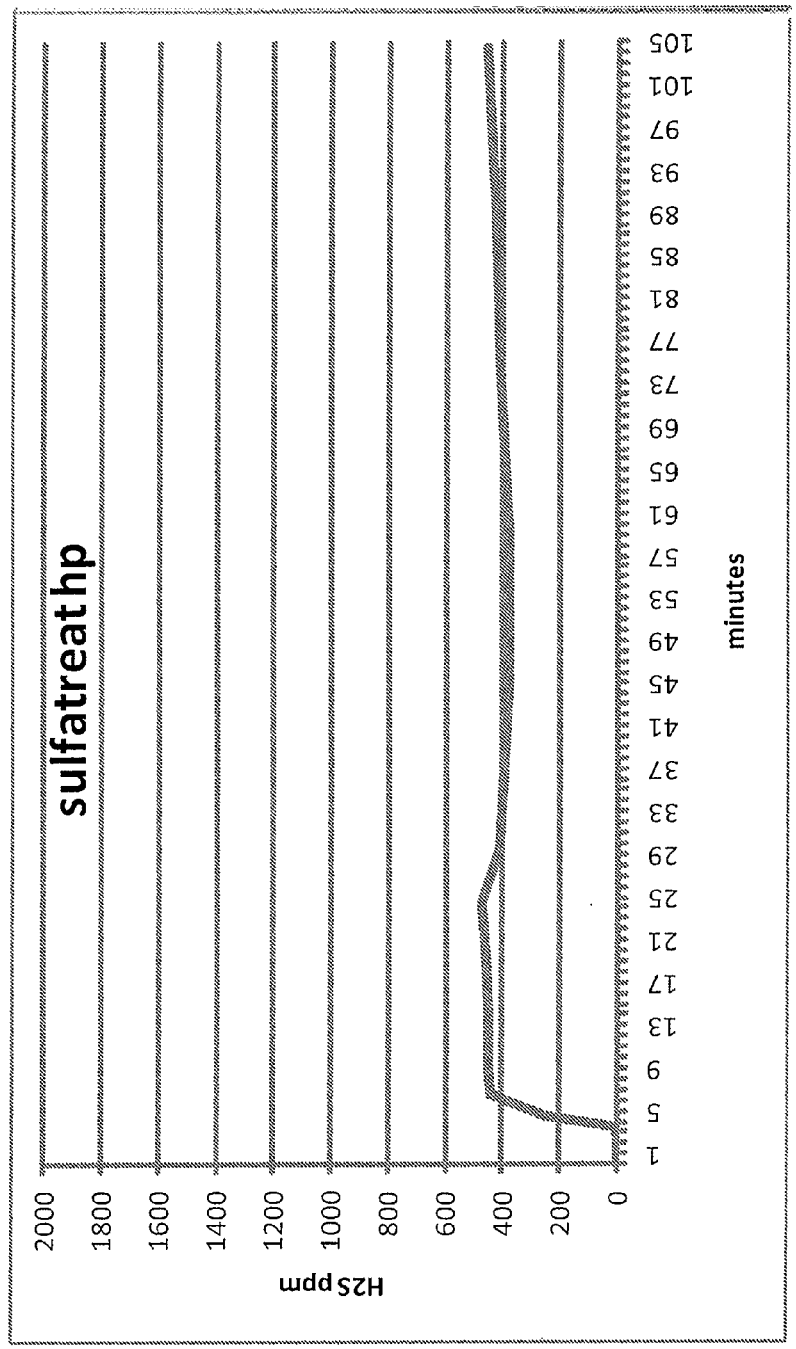
FIG. 4 shows the performance of an embodiment of the prior art in removing hydrogen sulfide from a gas stream.
Figure 5:
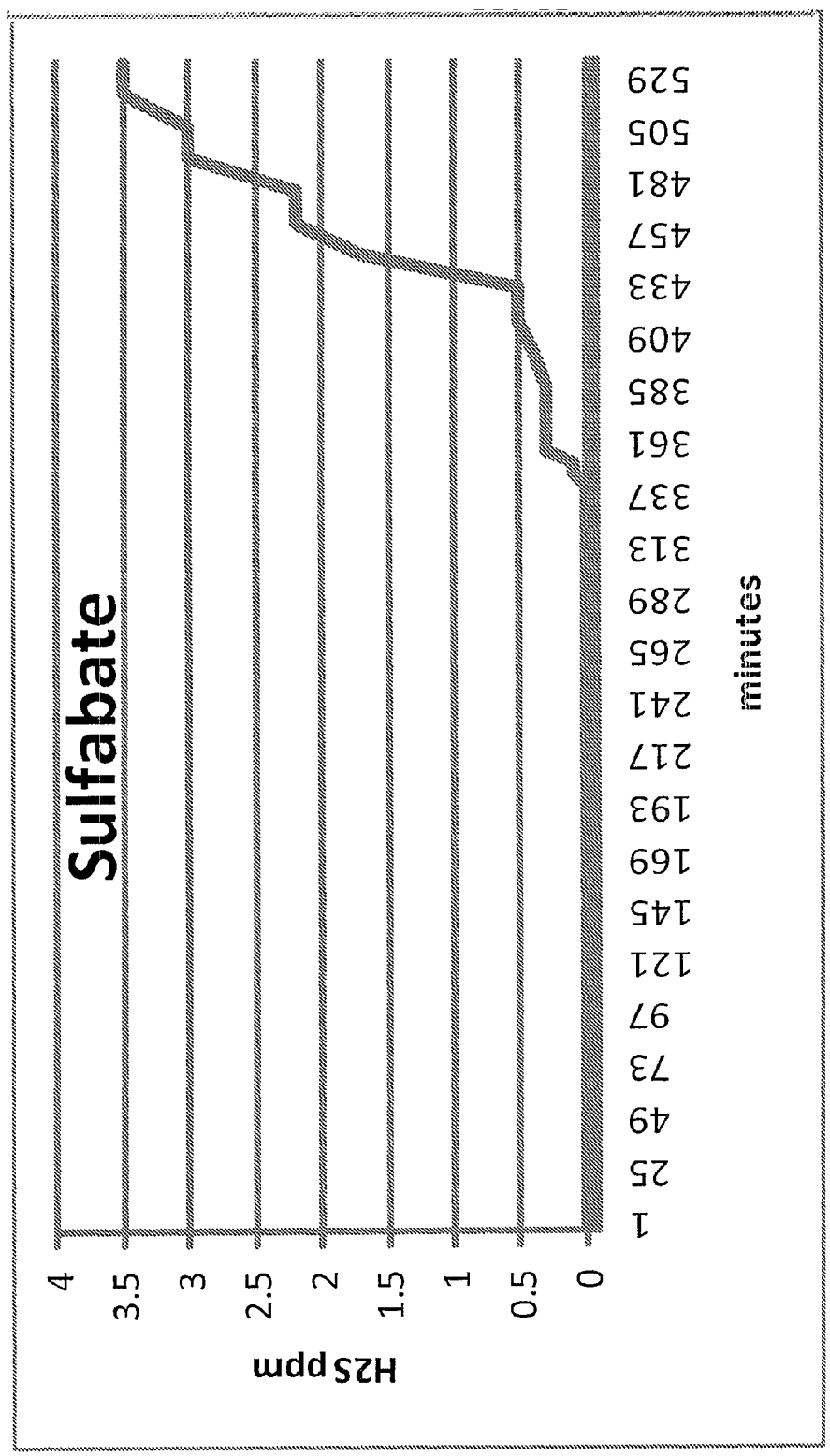
FIG. 5 shows the performance of an embodiment of the instant invention in removing hydrogen sulfide from a gas stream over a long period showing the relatively long breakthrough behavior of the embodiment.

FIGS. 3, 4, and 5 demonstrate the performance of the prior art and embodiments of the instant invention. FIG. 3 shows the results of a performance test of the "Iron Sponge" prior art material. As shown in FIG. 3, the concentration of $H_2S$ in the gas after it has passed through a sorption tower containing iron sponge was approximately 1,300 ppm at the beginning of the test. That concentration began to rise almost immediately and leveled off at approximately 1,400 ppm after only ten minutes. FIG. 4 shows the results of a performance test of the SULFATREAT® (M-I L.L.C., Houston, Tex.) prior art material, which is comprised of clay particles coated with iron oxide. As shown in FIG. 4, the concentration of $H_2S$ in the gas after it has passed through a sorption tower containing SULFATREAT® was initially zero. However, "breakthrough" occurred after only four minutes, when the concentration increased to approximately 400 ppm and remained relatively constant for the duration of the test. Finally, FIG. 5 shows the results of a performance test of an embodiment of the instant invention. As shown in FIG. 5, the concentration of $H_2S$ in the gas after it has passed through a sorption tower containing the Capture Material was approximately zero for 337 minutes, meaning that the Capture Material removes $H_2S$ for a much longer time than either the iron sponge or SULFATREAT®. As a result, the Capture Material in the sorption tower does not have to be removed and replaced as often as conventional materials, which increases the efficiency and decreases the costs of removing $H_2S$ from sour gas. In addition, because breakthrough for the Capture Material occurs much later, it is likely that the Capture Material reacts with $H_2S$ at a faster rate than either iron sponge or SULFATREAT®, thereby improving the efficiency of sour gas treatment.

The tests shown in FIGS. 3, 4 and 5 are conducted using the same testing parameters. The inlet gas was a gas blend containing nitrogen, 10,000 parts per million (ppm) carbon dioxide, and 2,000 ppm $H_2S$, and was hydrated to duplicate field conditions. The flow rate of the inlet gas was 5.5 standard cubic feet per hour, with a pressure of 5 pounds per square inch and a temperature of 70° F. The volume of iron sponge, SULFATREAT®, or the Capture Material through which the inlet gas was passed was 27 milliliters, and each material was screened to achieve granules ranging in size from 8- to 16-mesh. The concentration of $H_2S$ in the outlet gas was then measured and graphed in FIG. 3 (iron sponge), FIG. 4 (SULFATREAT®), and FIG. 5 (Capture Material).

With respect to the above description then, it is to be realized that the optimum relationships for the parts of the invention, to include variations in materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the above is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

TABLE I

X-ray Diffraction Analysis of $H_2S$ Removal Compound

| MINERAL CONSTITUENTS | CHEMICAL FORMULA | RELATIVE ABUNDANCE (%) |
|---|---|---|
| Quartz | $SiO_2$ | Trace |
| Calcite | $CaCO_3$ | 5 |
| Maghemite | $\gamma$-$Fe_2O_3$ | 70 |
| Lepidocrocite | $\gamma$-FeOOH | Trace |
| Amorphous | | 25 |
| TOTAL | | 100 |

TABLE II

Energy Dispersive X-ray Analysis Results

| | Element | Concentration (Wt. %) |
|---|---|---|
| Silicon | Si | 3.84 |
| Phosphorous | P | 3.26 |
| Sulfur | S | 3.9 |
| Calcium | Ca | 25.18 |
| Titanium | Ti | 1.55 |
| Manganese | Mn | 2.13 |
| Iron | Fe | 54.67 |

TABLE II-continued

Energy Dispersive X-ray Analysis Results

| | Element | Concentration (Wt. %) |
|---|---|---|
| Copper | Cu | 2.97 |
| Zinc | Zn | 2.49 |
| TOTAL | | 100 |

What is claimed is:

1. A hydrogen sulfide capture material having a structure that is comprised of $Fe(OH)_3$, wherein the capture material is formed by solubilizing an iron source in acid to form an aqueous solution comprising iron chloride, neutralizing the aqueous solution with a caustic solution of metal hydroxide to form a neutralized solution, washing the neutralized solution to separate the neutralized solution into water and a slurry, forming a thickened slurry by removing additional water from the slurry, separating the thickened slurry to produce filtered water and a wet filter cake, and drying the wet filter cake to form granules.

2. A hydrogen sulfide capture material according to claim 1, wherein the metal hydroxide is sodium hydroxide or calcium hydroxide.

3. A hydrogen sulfide capture material according to claim 1, wherein the material has a surface area ranging from 50 $m^2/g$ to 400 $m^2/g$.

4. A hydrogen sulfide capture material according to claim 1, wherein the material has a particle size of less than 1,000 nanometers.

5. A hydrogen sulfide capture material according to claim 1, wherein the material is combined with a binder.

6. A hydrogen sulfide capture material according to claim 5, wherein the binder is excess calcium hydroxide remaining after the neutralization solution is formed.

7. A method for making a hydrogen sulfide capture material, the method comprising the steps of:
   solubilizing an iron source in acid to form an aqueous solution comprising iron chloride;
   neutralizing the aqueous solution with a caustic solution of metal hydroxide to form a neutralized solution;
   washing the neutralized solution to separate the neutralized solution into water and a slurry;
   forming a thickened slurry by removing additional water from the slurry;
   separating the thickened slurry to produce filtered water and a wet filter cake; and
   drying the wet filter cake to form granules.

8. The method according to claim 7, wherein the metal hydroxide is sodium hydroxide or calcium hydroxide.

9. The method according to claim 7, wherein the neutralized solution has an end pH that is between 7 and 8 pH units.

* * * * *